United States Patent [19]

Groth et al.

[11] 4,146,372
[45] Mar. 27, 1979

[54] PROCESS AND SYSTEM FOR RECOVERING WATER FROM THE ATMOSPHERE

[75] Inventors: Wilhelm Groth, Bonn; Peter Hussmann, Munich, both of Fed. Rep. of Germany

[73] Assignee: Mittex Aktiengesellschaft, Vaduz, Liechtenstein

[21] Appl. No.: 781,890

[22] Filed: Mar. 28, 1977

Related U.S. Application Data

[63] Continuation-in-part of Ser. No. 746,951, Dec. 2, 1976, abandoned.

[30] Foreign Application Priority Data

Mar. 29, 1976 [CH] Switzerland .................. 3769/76

[51] Int. Cl.² ........................................... B01D 53/04
[52] U.S. Cl. ........................................ 55/33; 55/74; 55/80; 55/387
[58] Field of Search ............... 55/31, 33, 74, 80, 208, 55/316, 387; 165/10; 203/41, 49, DIG. 1

[56] References Cited

U.S. PATENT DOCUMENTS

| | | | |
|---|---|---|---|
| 2,037,685 | 4/1936 | Holden | 55/31 X |
| 2,138,689 | 11/1938 | Altenkirch | 55/33 X |
| 2,138,690 | 11/1938 | Altenkirch | 55/33 X |
| 2,462,952 | 3/1949 | Dunkak | 55/208 |
| 2,606,663 | 8/1952 | Blackman et al. | 210/413 X |
| 3,203,472 | 8/1965 | Brandt | 165/10 |
| 3,263,400 | 8/1966 | Hoke et al. | 55/33 |
| 3,400,515 | 9/1968 | Ackerman | 55/33 X |
| 3,674,429 | 7/1972 | Collins | 55/31 X |
| 3,846,251 | 11/1974 | Hay | 203/DIG. 1 |

*Primary Examiner*—Robert H. Spitzer
*Attorney, Agent, or Firm*—Richard L. Schwaab

[57] ABSTRACT

Water is recovered from air by a process utilizing the differences in the day-time and night temperatures of such air. The process is especially useful in subtropical desert areas. It consists in alternately removing the moisture from the cool night air by adsorption on suitable adsorbing agents and especially on silica gel and by utilizing the hot day-time air and, if desired and available, the radiation energy of the sun for desorption of the water stored in the adsorbing agent and for condensing the desorbed water by means of the cold stored during the night. An especially suitable silica gel is used for adsorption of the water contained in the air. The energy required for operating the plant is produced by passing the recovered water through energy producing installations such as turbines before it is used as drinking water or for irrigation. The process is very economical and, in contrast to seawater desalination processes, does not require additional thermal energy.

44 Claims, 4 Drawing Figures

PROCESS AND SYSTEM FOR RECOVERING WATER FROM THE ATMOSPHERE

CROSS REFERENCE TO RELATED APPLICATION

The present application is a continuation-in-part of U.S. application Ser. No. 746,951 of Wilhelm Groth and Peter Hussmann relating to PROCESS AND APPARATUS FOR RECOVERING WATER FROM AIR which application was filed on Dec. 2, 1976, and is now abandoned.

BACKGROUND OF THE INVENTION (1) Field of the Invention

The present invention relates to an economic process of recovering water from the atmosphere and more particularly to a process of recovering water from the air in countries in which the differences between the temperatures during the daytime and the night are considerable, i.e. in tropical and sub-tropical countries and especially in desert areas of such countries, and to a highly effective system and plant for carrying out said process.

(2) Description of the Prior Art

It is known to recover the moisture content from the atmosphere in the form of water by alternate utilization of the cool moist night air and dehumidifying such air by adsorption and utilizing the dry and warmer day air with or without additional radiation by, and utilization of the energy of, the sun for dehumidifying, i.e. desorption of the water stored in the adsorbing material followed by condensation of the thus desorbed water by means of the cold stored during the night time. However, such processes have not been utilized in actual operation because either the yield of the recovered water was too low or the required energy expenditure was too high and the investment and operating costs were in no relation to the amount and value of the recovered water.

SUMMARY OF THE INVENTION

It is one object of the present invention to provide a simple, effective, and economical process of recovering water from moist air, said process being substantially independent of any additional energy supply because the required energy is produced by the recovered water itself. The process makes possible to use the recovered water not only for drinking purposes but also in substantially unlimited amounts for irrigating agricultural soil, for instance, in desert areas. The yield of the recovered water is quite high and thus the expenditures are within reasonable limits.

Another object of the present invention is to provide an arrangement and plant for recovering the moisture from the atmosphere by means of such a process.

Other objects of the present invention and advantageous features thereof will become apparent as the description proceeds.

In principle the process according to the present invention consists in making use of a number of operational steps which, carried out as a whole, permit rational water recovery and which in their combination of steps and measures represent the essential features of the present invention.

For carrying out the process of this invention, a suitable adsorbing agent is to be employed. Said adsorbing agent is characterized by being able to adsorb water to a very great extent, i.e. up to about 80% of its weight, within a temperature range of below 0° C. and up to about 40° C. Furthermore, the adsorbing agent must give up its adsorbed water at a relatively low temperature, namely at a temperature starting at about 25° C. and not substantially exceeding about 70° C. The above-mentioned two temperature ranges are the temperatures which are encountered especially in subtropical desert areas during the day-time and at night, in each instance for a period of time of about ten hours. Therefore, the process of the present invention is especially suitable for the recovery of water from the atmosphere in subtropical areas, such as they are encountered in North Africa, Chile, Peru, and Australia, in part of the Southwest of the United States, and in other areas. Because the radiation from the ground in desert areas amounts up to 90%, in contrast to about 50% in other areas, temperature differences up to 40° C. between the day-time temperatures and temperatures during the night are usually observed in such areas. An adsorbing agent which is effective at a relatively low adsorption and resorption temperature range and which has a high water adsorption capacity, is the specific silica gel obtained according to the process of U.S. patent application Ser. No. 747,474, filed Dec. 6, 1976 of the inventors of the present application. The silica gel of said application is characterized by its high abrasion resistance and thus by its prolonged stability, durability, and usefulness. It is preferably employed in the form of spherical particles of a diameter between about 8 mm. and about 12 mm. Spherical particles of such a size have not been produced or used heretofore. Substantially no abrasion is observed even when using such silica gel beads in large scale operation for many years. Such spherical beads of a diameter between 8 mm. and 12 mm. have the further advantage that they offer a very low flow resistance to the air passing therethrough, in contrast to the known commercial silica gel types. Thus silica gel beads of such a diameter permit satisfactory operation in large recovery plants for many years and without any breakdown. The use of such silica gel beads is even more important because, due to their low resistance to the air flow, it is possible to reduce the energy requirements to such an extent that the economy of the water recovery process is assured. In order to economically recover water from the atmosphere, there is not only of importance each millimeter of water column pressure, but even each half a millimeter. When using such silica beads, a loss in pressure in the adsorbent layer of the recovery system of only 1 mm. to 2 mm. water column pressure is encountered, while with other adsorbing agents and also with the known silica gels and alumina gels the water column pressure amounts to at least 5 mm. to 10 mm. at the required depth of the adsorbent bed and the velocity of flow of the air. Thus when using the heretofore known adsorbing agents there would be required an additional consumption of electrical energy of more than 100,000 kw./hr. in a plant with a recovery capacity of 100 million kg. of water within 24 hours.

As it will be described hereinafter, the total energy requirements of the process according to the present invention are limited so as to overcome a maximum air flow resistance of 5 mm. to 8 mm. water column pressure at certain periods of time and of 3 mm. to 4 mm. water column pressure at other periods of time. This favorable result is achieved by combining the use of the specific adsorbent with a number of other measures and apparatus designs. The difference of the process according to the present invention over the process of desalination of sea water on a thermal basis is to be seen in the fact that no thermal energy is used and kinetic energy only to a limited extent. If at all, only limited amounts of additional energy are required. In general, the rather limited energy requirements can be fully satisfied in most instances by the construction of the recovery plant at locations of different elevation. Ranges or chains of hills and mountains, for instance, of subtropical areas and especially of desert areas can be utilized in order to build thereon the recovery plants. The differences in elevation of the various parts of the plant may amount to 200 m. and even to 1000 m. Although the climatic changes encountered thereby — a difference of 100 m. in elevation corresponds, as is known, to a shift in latitude of 150 km. — are connected with some disadvantages due to the drop in temperature at higher elevation but in general this is quite advantageous. The recovery system is constructed in such a manner that the amount of water which is recovered within a period of 24 hours is stored in the plant itself, for instance, in a suitable water reservoir. The collected water can then be conducted, depending upon the considerably fluctuating energy requirements, into water turbines with generators arranged at a lower level so that the entire potential and kinetic energy of the water is almost completely utilized for satisfying the current requirement of the recovery process. The economical self-sufficiency and autonomy of the recovery system according to the present invention is one of its essential advantages. The water can, of course, be used as drinking water or for irrigation purposes after it has passed through the turbines.

The recovery plants can be constructed in an ideal manner by using prefabricated parts. They can be erected at any place where water is needed. Thus they require only minor expenditures needed for the network for distributing the water.

Preferred prefabricated construction units are, for instance, units for recovering 1,000 cu.m. of water or 10,000 cu.m. of water within 24 hours. In the former instance there is required for the plant a space of 100 m. $\times$ 150 m. or 200 m. In the latter case there is needed a space of 100 m. $\times$ 2000 m. or 1500 m. or of 200 m. $\times$ 750 m. The additional costs required by applying the principle of constructing the recovery system with prefabricated parts which permit any desired increase in size, are of a magnitude of about 2% to about 4% and thus can be neglected when taking into consideration the advantages achieved by proceeding in this manner. Of course, when constructing a recovery system of a size which permits recovery of 100 million kg. of water within 24 hours, it might not be advisable to build such a system by using prefabricated parts. The use of prefabricated parts, however, renders the system quite foolproof and thus especially useful for far remote and difficultly accessible regions.

The amount of water which circulates continuously in the atmosphere in the form of water vapor, is about 12,900 cu.km. or 12,900 trillion cu.m. The moisture in the air is continuously subjected to condensation, precipitation, and again evaporation on the surface of the earth and the oceans.

Said gigantic natural water evaporation machinery transfers in about 30 cycles of 12 days each a mass of about 390,000 cu.km. of water (330,000 cu.km. from the oceans and 60,000 cu.km. from the ground, from lakes, rivers and the vegetation) into the earth atmosphere, i.e. an amount of about $390 \times 10^{12}$ cu.m. of water.

Part of this tremendous amount of water is conducted in the form of water vapor by the action of the winds in large amounts to desert regions where neither ground water, nor rain water are available.

The very considerable radiation in the amount of 90% in the desert regions in contrast to about 40% to 50% at other places of the earth produces differences of 20° C. to 40° C. between the day-time temperatures and the night temperatures. Therefore, it is possible to recover quite economically the 10 g. to 20 g. of water which are contained in 1 cu.m. of air. The water thus recovered from the atmosphere is pure water without any salt content and is no less valuable than that obtained from any other water source. It is probably even more valuable than the water recovered by desalination of sea water. According to calculations it is possible to recover water, when operating on a large scale, at a price of $0.162 per cu.m. whereby, of course, as usual complete amortization of the system within 50 years is included, but not the interest to be paid on the capital.

In principle the present invention comprises the following steps and features:

The night air is first passed through a bed of stones or other substantially non-adsorbent material which is cooled thereby. It is then conducted through a bed of coarsely granular, preferably shaped and most advantageously spherically shaped adsorbent material, preferably silica gel with pores of a large diameter.

The hot day-time air is conducted in reverse order and preferably also in reverse direction first through the layer of silica gel which will not be heated, and then through the bed of stones or the like material. In this manner the water adsorbed by the silica gel layer from the night air is desorbed and removed from said silica gel layer in a desorption or regeneration process by the hot day-time air and is condensed on the bed of stones and the like material which has been cooled by the night air. The condensed water is then drained off and conducted to the place of utilization.

Thus in principle the present invention comprises a process and a plant for recovering water from the air by utilizing the energy of the sun and conducting the air through a suitable adsorbing agent, especially through silica gel.

According to the present invention the cool night air is utilized for dehumidifying said air by adsorption and the hot day-time air for desorbing the water recovered during the night from the night air.

This is achieved, for instance, by providing a layer of stones or the like of a height of 3 m. to 5 m. and even more on an air-penetrable intermediate bottom. Above said stone or the like layer, there is arranged another air-penetrable intermediate bottom carrying a silica gel layer of 300 mm. to 400 mm. height. Said layer consists of coarsely granulated or shaped beads of silica gel. The layers of stone and silica gel are housed in a structure of, for instance, about 100 m. to 200 m. width and up to 15 m. length. In order to conduct the air alternately in opposed direction to each other through the recovery system, there are preferably provided at suitable places a number of fans for supplying the air and for conducting it away. The air is taken from near the earth surface and is conducted into the recovery system for adsorption because the lowest temperatures are always encountered near the ground during the night. Proceeding in this manner is of advantage because adsorption should always take place from below upwardly while desorption should always be carried out from above downwardly so that the water can be recovered.

It is a preferred feature of the present invention that the flow of air is subdivided by a number of fans of low efficiency arranged side by side into several individual air streams and that the recovery operation is carried out at a low air velocity. When using the silica gel beads described hereinabove, they offer a lower resistance to the air stream due to their shape and to the thus produced interspaces in the gel layer. On the other hand, the surface area of the gel which is contacted by the air flow and which is responsible for the extent at which the water is exchanged, is reduced by using such a gel. To compensate for this reduction in gel surface, the time within which the air contacts the gel particles is increased due to the low speed of air flow.

In order to enable production of energy, for instance, for operating the fans, the water recovery plant in accordance with a further feature of the invention is built at a higher elevation, preferably on top of a mountain. The water which is recovered in said recovery system is utilized for producing electric energy, for instance, in a turbine at a place which is at least 200 m. lower than the recovery plant. To construct the recovery system at a higher elevation has the further advantage that the night temperatures are lower than at a lower elevation. As a result thereof, a better cold storage effect is achieved and the air has a higher moisture content than at a lower elevation so that the yield of water is greater. It has been found that it is of no disadvantage that at a higher elevation the temperature of the air during the day-time is somewhat lower than at a lower elevation because this is compensated for by the greater solar radiation which is utilized for heating the silica gel layer and the air conducted therethrough.

The process according to the present invention is made possible by operating intermittently with rest periods in between so that a noticeable difference in temperature between adsorption during the night and desorption during the day exists. Thus the air is passed through the recovery system alternately in directions opposite to each other in cycles of about 10 hours each time with about two hours interruption by rest periods in such a manner that, on humidifying the gel during the night, the air is of an average temperature between 0° C. and 20° C. and, on desorption and removing the moisture from the adsorbent during the day, the average air temperature is between about 25° C. and about 70° C. Proceeding in this manner according to the present invention is made possible more particularly by using the novel types of silica gel mentioned hereinabove. Such a gel possesses properties allowing operation at a considerable range of desorption and adsorption temperatures, i.e. the water is adsorbed by such a gel at a temperature between 0° C. and 40° C. and is desorbed therefrom at a temperature between 25° C. and 70° C. In contrast thereto the desorption temperature of the heretofore known silica gels is between about 80° C. and about 180° C. The gel produced according to the above-mentioned Swiss Patent Application No. 7224/75 is especially suitable for carrying out the process of the present invention. It is characterized by pores of a large diameter, by an adsorption temperature of up to 40° C., and by a desorption temperature between about 50° C. and about 70° C. Other silica gels which are obtained by said process are also quite useful. They have even wider pores, and are effective at an adsorption temperature up to 30° C. and at a desorption temperature between 40° C. and 60° C. or they have extremely wide pores and are effective at an adsorption temperature up to 20° C. and a desorption temperature between 30° C. and 50° C. The process according to the present invention can be used preferably in desert areas, especially in subtropical zones because in such areas the day-time temperature is lowered considerably during the night, due to radiation, to temperatures between 5° C. and 20° C. while the relative humidity increases to between 70% and 95%. Sometimes even dew point humidity is observed. All these factors, in addition to the low temperatures, contribute to the absorptive capacity of gels having extremely wide pores, i.e. pores of a diameter of 35 Angstroem to 50 Angstroem or of 50 Angstroem to 70 Angstroem.

Conversely the high temperatures during the day-time which are between 30° C. and 70° C. allow desorption or regeneration of the adsorbed water when using silica gels of such a range of adsorption and desorption temperatures and of such desorption characteristics. The desorption or regeneration temperatures can be increased in any case by at least 10° C., and in most instances by 10° C. to 15° C., by making use of direct solar radiation.

The solar constant, as is known, amounts to 1.94 cal./sq.cm./min. This means that the regeneration air can be heated at a day-time temperature of at least 40° C. by around 10° C. to 12° C., i.e. it can be increased to about 50° C. to 52° C. when taking into consideration the good thermal degree of efficiency of the sun energy of 70%, in contrast to the degree of efficiency of the conversion into kinetic energy which still causes great problems. Due to said increase in temperature of the air used for desorption and regeneration a degree of desorption of the silica gel of 95% to 100% is achieved and thus an extreme degree of economy of operation.

By providing domes or sloping surfaces of the covering of the plant building which is constructed as an inclined desk-like roof as well as at the upper side band of the vertical surfaces of said building permeable to rays of the sun it is possible to further improve utilization of the energy of the sun and thus to increase the temperature, notwithstanding that in nature itself the cycle of about 10 hours of daylight and 10 hours of night proceeds exactly according to the Mollier diagram for humid air with respect to the i,x-values. It is not necessary to discuss more in detail in this connection the extensive calculations of each single process step with its temperature values, moisture contents as well as kcal. contents.

The use of the novel gels having a large diameter results in a smaller gel surface at a constant volume. Due thereto abrasion is decreased and thus also the danger of contamination. Hence the water recovery system according to the present invention requires relatively little maintenance expenses and its working life is increased.

According to another embodiment of the present invention the stone layer may consist of shaped concrete bodies such as concrete spheres. However, their manufacture is still rather expensive. Therefore, preferably natural stones of a high specific gravity are used. Due to their high specific gravity and their low porosity they are especially suitable for cold storage or accumulation. For instance, basalt or silicate stones of a diameter of 100 mm. to 250 mm. are especially useful. They can be provided, if required, with a thin silicone coating in order to close their pores.

It has proved to be especially advantageous according to the present invention to cover the building with a sun roof having a surface of glass, polyacrylic glass, polyester, or the like plastic material. Such a covering causes a temperature increase of the silica gel layer placed below said roof, by at least 10° C. during desorption on account of the sun's radiation.

The sun roof may be constructed not only of glass or, when using sunlight collectors, of aluminum plates with an aluminum oxide coating which has been colored in black, but also of black polyester fabric coated on both sides with polyvinylchloride. Such a polyester fabric is considerably more resistant to abrasion and much stronger than glass, aluminum, or polyester sheets, because the latter are scratched and rendered light-impenetrable within a relatively short period of time by the action of the sand which is always carried along by the wind. The polyester fabric can be kept under tension by the gauge pressure of about 5 mm. water column within the interior of the plant. By alternately tensioning and loosening the fabric within predetermined intervals, it is possible to readily free the same of dust and sand. The use of the fabric permits furthermore to use a considerably lighter carrying frame structure of the roof, said structure consisting preferably of steel or concrete struts which carry the fabric elastically anchored and sealed thereto.

Furthermore it is advisable not to construct the recovery system as a construction unit which may be 15 km. long but to subdivide said unit into single elements between which, if desired, passages are retained by making use of the construction principle by means of prefabricated parts.

It is also of importance according to the present invention to protect the openings for supplying and discharging the air by providing filters attached thereto because of possible sand storms. For this purpose there is preferably arranged a filter sheet made of filter fabric underneath the air-permeable intermediate bottom. Said filter sheet can be swung or pivoted out from said intermediate bottom, so as to allow the water to freely flow out of the stone or the like layer during desorption. A brushing device with rotating brushes which can be raised or lowered and can travel along the filter sheet is arranged below said sheet. Said brushing device removes, when raised, the sand from the filter fabric and collects it at the floor when lowered.

BRIEF DESCRIPTION OF THE DRAWINGS

The object and advantages of the present invention will be manifest to those skilled in the art with reference to the accompanying drawings in which.

DESCRIPTION OF THE PREFERRED EMBODIMENT

Figure 1:
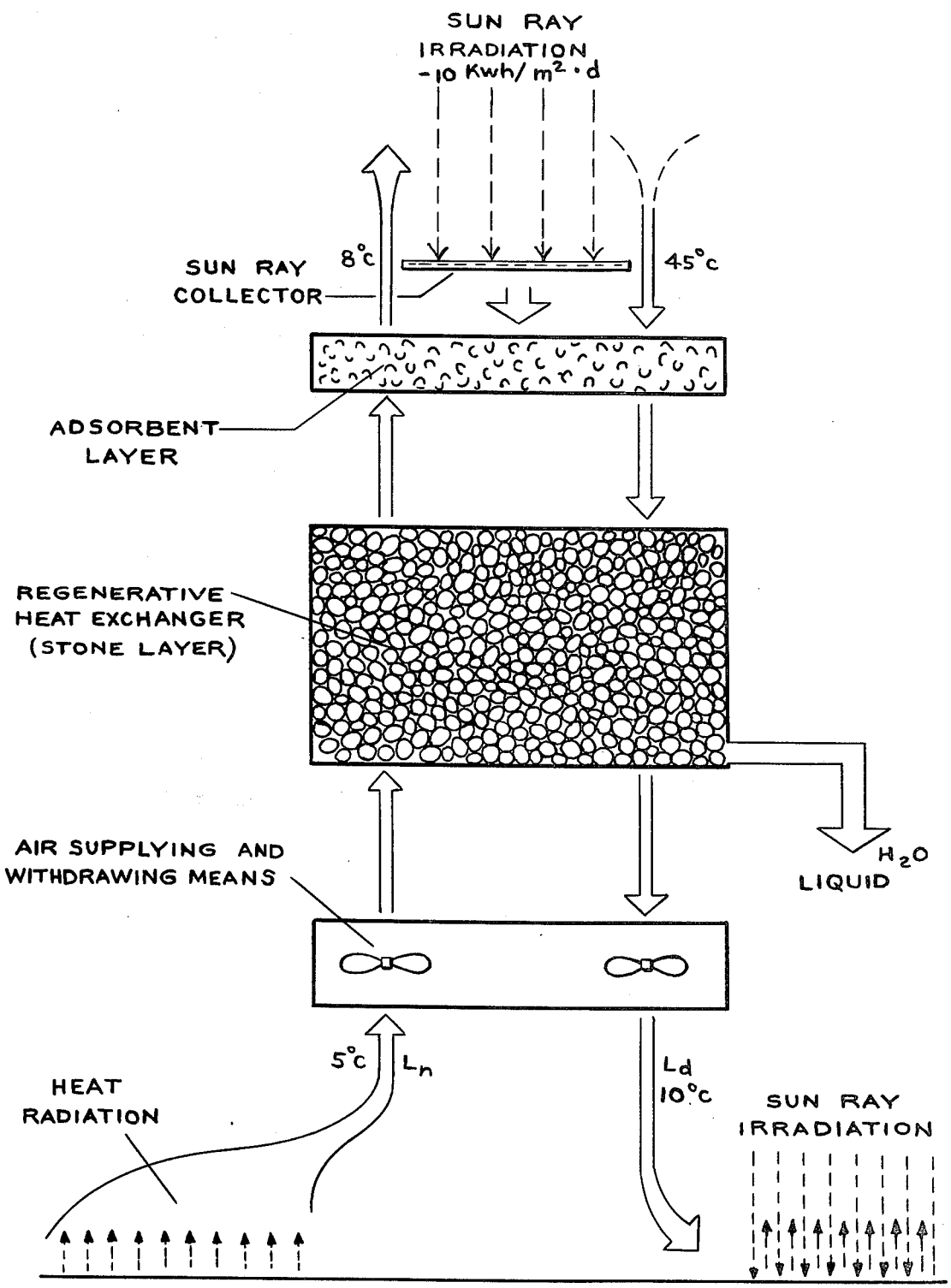
FIG. 1 represents a flow sheet of the process according to the present invention and FIG. 2 illustrates in cross-sectional view the system for recovering water from the atmosphere according to said process.

The flow sheet of FIG. 1 shows schematically the adsorbent layer, the regenerative heat exchanger of substantially non-absorbing material, the air supplying means, the collector of the radiation caused by the rays of the sun, and the flow of the cool night air and the reverse flow of the warm day-time air. It is clearly evident from FIG. 1 in which manner the process of the present invention is carried out.

The following examples serve to illustrate the present invention without, however, limiting the same thereto.

EXAMPLE 1

Figure 2:
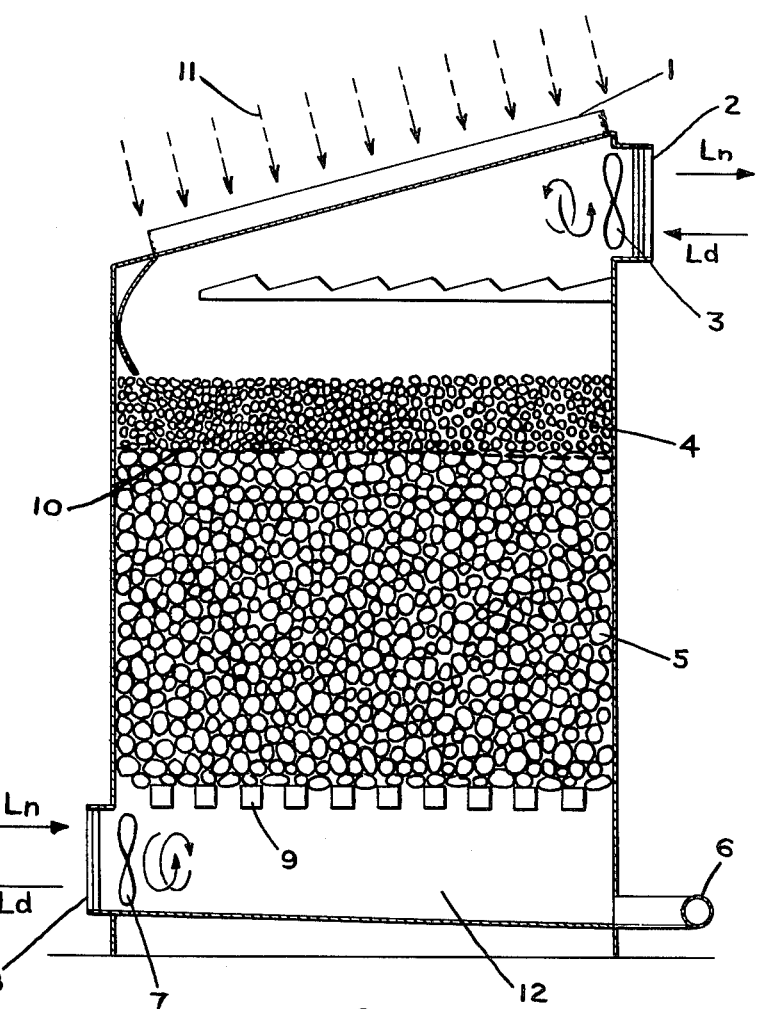

A large scale water recovery system according to the present invention is constructed for a recovery of 100,000 cu.m. corresponding to $10^8$ kg. of water within 24 hours. Said system has a surface area of 2,000,000 sq.m. in order to operate under the most economical operating conditions, i.e. with a minimum of energy consumption and with complete self-sufficiency in energy. It is slightly inclined toward its broader side as indicated in FIG. 2 so as to permit the water to run off. Its sidewalls consist of reinforced concrete, for instance, of a height of 6 m. The total height is 8 m. on one side and about 11 m. on the other side. The plant can be constructed from prefabricated parts in separate units or as a complete building of 15,000 m. length and 135 m. width or of 20,000 m. length and 100 m. width or of 10,000 m. length and 200 m. width. The last mentioned width of 200 m. represents the maximum width for reasons of proper flow conditions. The unit is provided at a height of 2 m. with a reinforced concrete grate 9 which carries a stone layer 5 of 8,000,000 cu.m. These stones which preferably are silicate stones of at least about 100 mm. diameter and of a maximum diameter of 250 mm., or spherical concrete pieces, absorb $6^{10}$ kcal. for subsequent cooling at the cooling temperatures during the night and on account of the specific heat of 0.2 of the stone or concrete layer and also the concrete building itself which acts as heat exchanger. The stone or the like layer cooled by the night air after it has passed through the silica gel layer 4, is used during the day-time for condensing the water vapors which have been desorbed from the silica gel layer and are passed downwardly through said stone or concrete cooling layer so as to condense the water vapors obtained by desorption (100,000,000 × 600 kcal.). Depending upon the water content of the night air there are required 7–10 × $10^9$ cu.m. of air during the night in about 10 hours. The upper silica gel layer 4 amounts to 150–160 × $10^6$ kg.

The desorbed water condensed in the stone layer 5 is collected at the bottom of the system which is constructed in the form of a flat collecting trough 12 and is discharged through water outlet 6 either to operate turbines, preferably arranged at a much lower elevation, or directly as drinking water or for irrigation.

Filters 2 and 8 are provided before the openings through which fans 3 and 7 supply the air to the recovery system or withdraw it therefrom. The silica gel 4 is placed on grate 10. Ld indicates the path of the warm day-time air through the recovery system. The temperature of the day-time air can be increased by radiation by sun rays 11 which are collected by collector 1, so as to facilitate desorption of the water adsorbed during the night by the silica gel layer 4. Ln indicates the path of the night air through the recovery system. The cool night air first cools the stone layer 5 and is dehumidified by passing through the silica gel layer 4 wherein the water is adsorbed.

EXAMPLE 2

Figure 3:
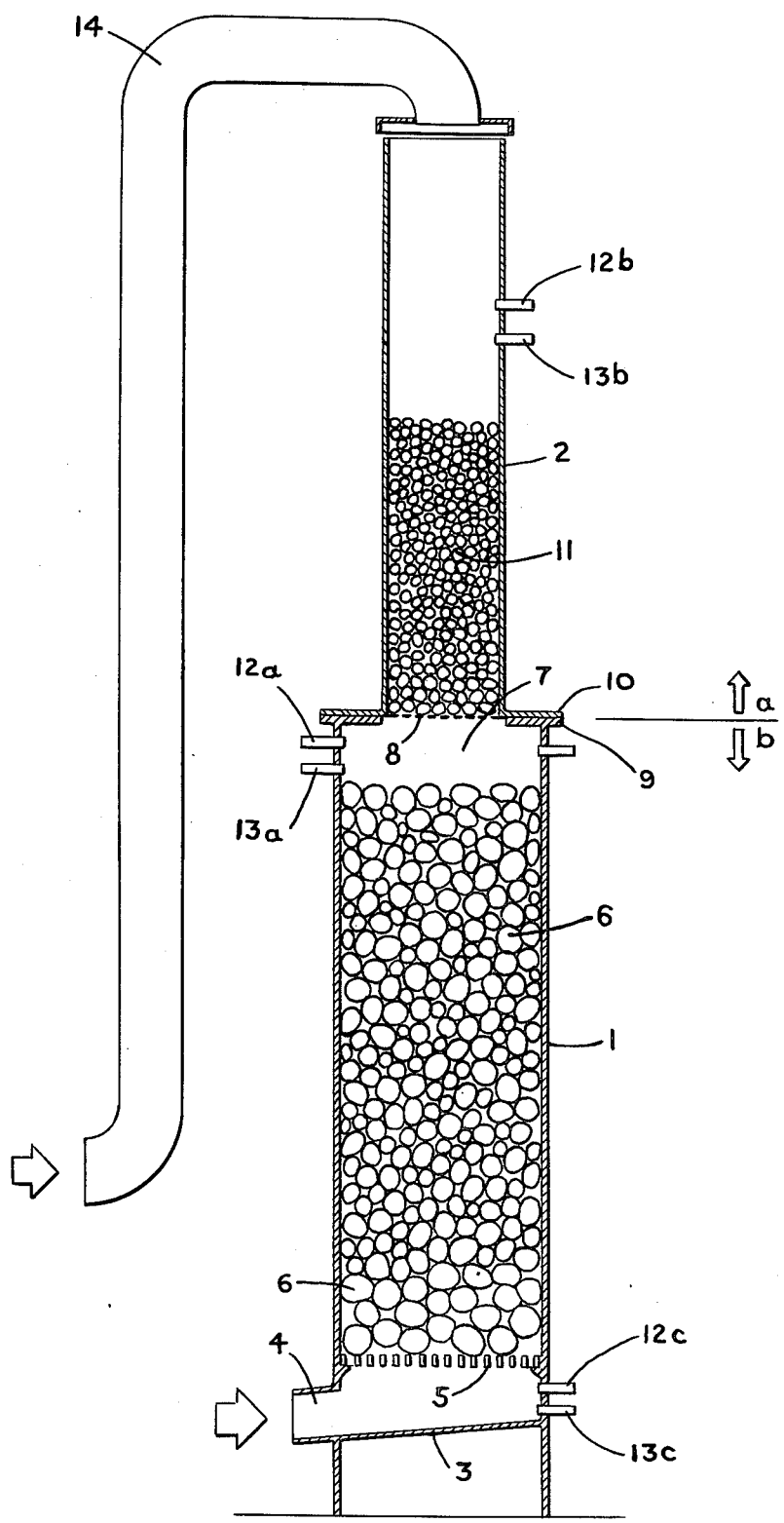
FIG. 3 illustrates in cross-sectional view a laboratory apparatus for testing adsorbent and heat-exchanging agents for their usefulness in said process.

In order to carry out preliminary experiments so as to determine the preferred adsorbent agents and regenerative heat exchange materials of the water recovery plant according to the present invention and their particle size, shape, and other parameters, there is employed a small scale apparatus as illustrated in FIG. 3. This apparatus permits to determine which type or types of stone or other non-absorbing heat exchange material as well as of adsorbing agent, for instance, of silica gel of different shape, particle diameter, pore width, and other characteristic features and parameters is the preferred agent for the respective location, which amounts of water can be recovered, etc. It allows visual observation of the water recovery process.

The apparatus of FIG. 3 consists of a lower tube 1, for instance, of glass or transparent plastic material such as "Plexiglass", for instance, of a diameter of 140 mm. Bottom 3 of said lower tube 1 is slightly inclined by about 5° towards the air inlet or, respectively, outlet opening 4. Inclination of the bottom allows the condensed and recovered water to flow out through opening 4 so that its amount can be measured. The stone or the like bed 6 serving as heat (or cold) retainer or storage means is arranged on grate 5. It is filled into tube 1 through top opening 7.

Sieve 8 is placed on top of tube 1 and is kept in place by flange 9 of lower tube 1 and flange 10 of upper tube 2. Said upper tube 2 consists also of glass or transparent plastic material, such as "Plexiglass". It has a diameter, for instance, of 80 mm. and is filled with the adsorbent layer 11 of the material to be tested, preferably of silica gel particles or beads. The silica gel bed 11 may be arranged in several layers of particles of different pore width and particle size. Pairs of measuring probes 12a and 13a, 12b and 13b, and 12c and 13c are provided in tubes 1 and 2 above heat exchange layer 6 and adsorbent layer 11 as well as below grate 5. These probes permit temperature and humidity measurements.

Air outlet pipe 14 is placed upon the upper opening 15 of tube 2 as shown in FIG. 3. Pipe 14 is not only used for conducting the dehumidified night air from the apparatus but is also provided with means conducting the warm day-time air into the apparatus to pass through adsorbent bed 11 having adsorbent therein the moisture of the night air and through cooled heat exchange bed 6 for condensing the desorbed water.

The apparatus described hereinabove and illustrated in FIG. 3 is used in the same manner as explained in Example 1 in order to determine at any location the most effective adsorbent agent, its shape, size, and pore diameter, the preferred stone or the like non-adsorbent heat exchange material and its size, and shape, the most advantageous speed and pressure at which the moist night air and the daytime air is passed through the apparatus and the amount of water which can be recovered.

On carrying out the process of recovering water according to the present invention it was found that it is also possible, if only drinking water is to be recovered, to use smaller plants and even portable apparatus. Although the water recovery costs will be higher than when using plants of the size described in Example 1, the costs of one liter of water will still be only fractions of a cent. The regenerative heat exchanger beds of stones and the like materials which require considerable space, can be replaced in such smaller plants and portable apparatus by conventional heat exchanger designs, for instance, of steel or by direct transformation of energy, for instance, by means of heat pumps.

While special sunray collectors, for instance, of aluminum sheets provided with a black aluminum oxide layer, as they will be described hereinafter in connection with FIG. 4, may be arranged in order to substantially completely utilize the energy of the sun for desorption, it is usually sufficient to increase the temperature of the daytime air introduced into the plant for desorption by allowing the sunrays to directly radiate into the plant through horizontal or inclined glass plates or transparent plastic plates 1 of FIG. 2 since almost 100% of the sunrays can pass therethrough.

In order to achieve ideal absorption of the heat rays of the sun, it is also advisable to provide the uppermost one or two cm. of the adsorbent layer 4 (FIG. 2) with a black or dark blue or any other dark color causing maximum absorption of the heat rays. Such dyeing of the uppermost layers of absorbent may be achieved, for instance, by interspersion of carbon black particles, by a treatment with a dark blue cobalt salt solution, or by like coloring methods. Of course, the daytime air must be able to pass in uniform distribution through the entire uppermost adsorbent layer treated in this manner. As a result thereof, the radiant heat of the sun is uniformly and continuously carried along with said daytime air. Thus, ideal heat exchange and increase of the temperature of the daytime air used for desorption is achieved.

To overcome the especially difficult construction and climatic conditions in desert locations, it is advisable to use prefabricated adsorption units in which the adsorbent, for instance, the silica gel is placed between two perforated or slotted plastic plates of 2 sq.m. to 20 sq.m. surface in layers of 250 mm. to 400 mm. thickness. Said layers are laterally encased by polyethylene or nylon fabric. The resulting prefabricated units are joined together in a frame-like manner similar to door fastenings or window sashes by means of elastic plastic seals. In this manner they form an endless adsorption area of any desired size.

In order to prevent sand dust to penetrate into the adsorbent layer and the heat exchanger layer, there are provided, as described hereinabove, filter layers, for instance, of very fine-meshed "Monofil" filter cloth which has been calendered three to four times to yield a mesh width of about $2\mu$ to $5\mu$. Such a filter retains about 99.9% of even the finest dust. The filters are installed, for instance, on the prefabricated units of adsorbent agents in advance of the night air entering the stone layer.

Furthermore, substantially all of the dust can be filtered out before entering the water recovery system by providing the black or dark colored adsorbent layer, for instance, the silica gel layer, in the form of a fine granular layer of a height of 1 cm. to 2 cm. encased by the above-mentioned fine-meshed fabric so as to form a filter mat. Such a granular material is obtained, for instance, by producing the silica gel in spherical shape, i.e. in the form of spherical beads as described in U.S. Application Ser. No. 747,474 of Wilhelm Groth and Peter Hussmann, which application is referred to by reference herein. Such a filter mat of granular material can be produced relatively inexpensively and can be discarded and thrown away after a few years of use.

The novel silica gels and method for producing same disclosed in the aforesaid U.S. application and Swiss Patent Application No. 7224/75 comprise producing silica gel containing from about 16 to 24% of silicon dioxide from silicic acid containing starting materials and an acid by precipitation whereby, as an intermediate product, an unstable silicic acid containing sol is formed, followed by gelling, removing the salts by washing, and drying of the gel.

According to an advantageous embodiment, the precipitation or reaction of the alkaline component of the waterglass with the acid is carried out in two steps in such a manner that at least in the first step the starting solution with a silicon dioxide content between about 20% and about 32% is introduced into the acid contained in the reaction vessel until a pH-value of said acid between about 1.5 and about 1.8 is attained. The starting solution is introduced into the acid reactant in such a fine distribution, for instance, by injecting it into the reaction vessel through nozzles provided at the bottom of the precipitation vessel, under a high pressure and at a correspondingly high discharge velocity, while the acid solution is continuously and very vigorously stirred, so that the reaction between the acid reactant and the silicon dioxide containing reactant takes place instantaneously without precipitation of silicic acid flakes.

In the second reaction step the silicon dioxide content of the starting material is reduced to a value between about 8% and about 14%. Such a reactant solution of lower concentration is introduced into the acid reactant until a pH-value between about 2.6 and about 3.5 is attained. Thereupon, the resulting sol of a silicon dioxide content of 14% to 18% is transferred into a gelling vessel which can also be used for washing and drying. Removing the salt formed during reaction with the acid by washing before drying the gel is carried out with a washing liquid having a pH-value between about 1.8 and about 12.0. When starting with a waterglass solution containing up to 32% of silicon dioxide, it is possible to dilute the 95% sulfuric acid used as acid agent to a sulfuric acid content between about 10% and about 12%. However, when starting with a waterglass solution containing about 20% of silicon dioxide, the sulfuric acid must be diluted only to about 20% to 30% in order to produce sols of the high concentration of up to 18% of silicon dioxide.

It is known to vary the pH-value of the washing liquid in order to produce gels of different properties. The present invention permits the use of washing liquids of much more graduated pH-values. Thus, for instance, silica gels of the properties given in the following Table can be obtained:

| Type of Gel | Wash Water pH | Pore Diameter (Angstroem) | Wetting Heat (cal./g.) |
|---|---|---|---|
| EE | 1.8–2.5 | 20–25 | 32–35 |
| E | 2.5–3.5 | 25–30 | 26–30 |
| M | 5.0–6.0 | 30–40 | 18–22 |
| W | 7.0–8.0 | 40–50 | 15–18 |
| WW | 8.0–10.0 | 50–60 | 12–15 |
| WWX | 10.0–12.0 | 60–70 | 10–12 |

| Type of Gel | Bulk Weight (g./cubic cm.) | Adsorption Temperature (° C.) | Desorption Temperature (° C.) |
|---|---|---|---|
| EE | 720–770 | up to 100 | 150–200 |
| E | 680–720 | up to 80 | 120–150 |
| M | 560–680 | up to 60 | 80–100 |
| W | 460–520 | up to 40 | 50–70 |
| WW | 300–460 | up to 30 | 40–60 |
| WWX | 250–350 | up to 20 | 30–50 |

The abbreviations given in said Table designate gels of the following pore diameter:
EE = Gel of the smallest pore diameter;
E = Gel of small pore diameter;
M = Gel of a pore diameter of medium size;
W = Gel of a pore diameter of large size;
WW = Gel of a pore diameter of still larger size;
WWX = Gel of a pore diameter of extremely large size.

According to another embodiment, the properties of the silica gel can be further improved by using, for precipitation by reaction with the acid reactant, a starting waterglass solution of a molar proportion of sodium oxide to silicon dioxide between about 1.0:3.5 and about 1.0:5.0. In contrast thereto, the molar proportion of commercial waterglass solutions is at the most 1.0:3.33 and usually only 1.0:2.1 and even lower.

Such a waterglass is produced by reacting quartz sand with an at least 50% sodium hydroxide solution at a temperature between about 130° C. and about 180° C. and under a pressure between about 4.0 atmospheres gauge and about 12.0 atmospheres gauge. The proportion of the mixture of sand and sodium hydroxide solution is selected so that a waterglass solution containing sodium oxide and silicon dioxide in a proportion between about 1.0:3.5 and about 1.0:5.0 is obtained.

Two parts of a 50% to 60% sodium hydroxide solution are employed for four parts of sand in order to achieve, for instance, a molar proportion of sodium oxide to silicon dioxide between about 1.0:3.8 and about 1.0:4.0. The reaction duration is between about 2 hours and about 4 hours.

When dissolving the sand in this manner, a semi-solid or semi-fluid product is obtained. Said product is adjusted to the concentration required for precipitation by diluting the pasty reaction mixture with water or preferably with the decantation or filtration solutions obtained from the sludge remaining after settling and clearing the waterglass solution discharged from the autoclave.

In order to avoid any precipitation of silicic acid and to produce a gel of a firmer structure which permits a more prolonged use, it is possible to carry out, according to another embodiment, the second precipitation or neutralization step only up to a pH-value of about 3.0 and to reduce in a third step the silicon dioxide content of the starting reactant to a value between about 5% and about 8% in a discontinuous operation until a required pH-value, for instance, of 3.2 is attained. The starting waterglass solution can be added in the second and third steps at a lower rate of throughput by means of the same nozzles or even by means of nozzles of a narrower cross-section.

The following measures must be taken in order to produce a silica gel with pores of extremely large diameter which is able to adsorb water up to 80% of its weight at temperatures of +20° C. to below 0° C. While adsorption starts at a temperature of 30° C., and which has a desorption effectiveness of 95% to 98% at 50° C. to 55° C. already.

(1) The starting reactants have a very high sol concentration as it is achieved by a high concentration of the sodium silicate and a high acid concentration. Amounts of 1% to 5% of sodium sulfate when using sulfuric acid for precipitation, or of the same amounts of sodium chloride when precipitation is effected with hydrochloric acid, are preferably added.

(2) The washing step is carried out at a pH-value between about 7.0 and about 11.0.

(3) The temperature of the wash water should not be lower than 15° C. and should increase to 50° C.

(4) The gel is dried by a multi-step process of drying thick layers of the gel of a thickness up to 1.5 m. starting at a temperature not exceeding 60° C. and at a relative air humidity of at least 80% to 90%. The principle of counter current battery system is preferably applied to the drying process.

(5) Gelling is preferably accelerated by simultaneous pre-drying whereby the syneresis is increased. Said simultaneous gelling and pre-drying should be carried out to a water content of the gel of about 15%.

(6) By the addition of iron, magnesium, and/or aluminum salts to the wash water, the water adsorption capacity can even be further increased. Such additions must, of course, be avoided when producing gels with pores of a small diameter.

The different adsorption temperatures of the new gels render such gels especially useful for drying gases. In accordance with a special embodiment of the present invention several layers of gels of different pore diameter are arranged one after the other in the stream of gas to be dried in such a manner that the optimum adsorption temperatures of the successively arranged gels have increasing values while the optimum regeneration temperatures have decreasing values. In order to regenerate the gels, the gas is conducted in reverse direction as compared with the gas drying step, through the layers of gels.

By using the various gels in several subsequently arranged layers whereby the gels have the adsorption temperature values as given in the Table hereinabove, the result is achieved that the gas can be dried at optimum acitivity of the gels for a considerably more prolonged period of time than heretofore possible, because the temperature of the gas to be dried increases from passing through one gel layer to the next layer. Conversely the temperature of the regenerating gas which is passed in reverse direction through the gel layers, decreases accordingly. Thus the heat expenditure required for regeneration is considerably reduced. In fact the savings in heat and energy expenditures amount to up to 50% of the heat and energy required heretofore for regeneration. Only 750 kcal. to 800 kcal. are required according to the present invention for the desorption process in contrast to about 1500 kcal. as needed when proceeding with silica gel as available heretofore. Thus a similar effect is achieved in this gas drying process as in the multiple-effect evaporation process.

The costs for constructing water recovery plants in desert areas can be reduced considerably by employing prefabricated concrete, steel, or the like structural units. Thus the carrier framework for the stone or the like layer serving as regenerative heat exchanger can be made without providing full length columns or posts except on its sides. The load carrying columns or posts for the grate upon which the heat exchanger material such as the stones are positioned can be limited in their height to 1 m. to 2 m. The columns or posts and the grate supports can be fitted into each other in the form of accordingly constructed prefabricated parts.

The preferably prefabricated adsorbing units described hereinabove can be placed directly upon the upper surface of the heat exchanger layer while, at the same time, the roof of the recovery plant is constructed in a lightweight construction manner as a carrying grate made, for instance, of aluminum or of glass fiber reinforced polyester. Said carrying grate roof accomodates the solid or elastic plates, for instance, glass panels upon which the sun energy and rays incide. In this manner more than 20% of the total construction costs can be saved.

Very considerable further savings in construction costs can be achieved by making use of the mode of constructing the building for the water recovery process according to the present invention as a so-called collapsible pneumatic housing unit or hanger. In this case the adsorbent and regenerative heat exchange layers are enclosed by an air impermeable fabric or plastic sheet material which may be transparent at the place above the adsorbent layer so as to cause the sun rays to increase the temperature of said layer during the daytime. Said fabric or plastic sheet material is caused to expand in a balloon-like manner by introducing the air thereinto under a slight positive pressure and passing it through the adsorbent and heat exchange layers. Due to said positive pressure a hall or a hangar containing said layers is formed. Although the foundation of concrete, steel, or polyester and the grate supports for the heat exchanging and adsorbent layers are still required, such a mode of construction by means of collapsible pneumatic housing units permits to very considerably lower the construction costs, for instance, by about 300% and to reduce about tenfold the time for establishing the water recovery plant, especially if the angle formed by the side walls of the pneumatic housing units is made as steep as possible and if the total height of the unit is between about 8 m. and about 12 m. The lateral surfaces are preferably provided with an elastic plastic foam insulation at least up to the upper surface of the heat exchange layer, while the lateral surfaces at the sides of the adsorbent layer, usually up to their height of 1 m. to 2 m., as well as its total upper surface above said adsorbent layer are of a material which is substantially transparent to the sun light and allows penetration of the sun rays therethrough.

In general a pressure of 8 mm. to 18 mm. of water pressure of the day or night air to be blown into the collapsible pneumatic housing unit and through the adsorbent and heat exchange layers is sufficient to set up the unit. While with permanent rigid structures it is possible to provide reversible fans only at the lower part of the structure, i.e. pressure fans for introducing the cold night air and suction fans for drawing in the daytime air heated by solar energy, it is necessary, when using collapsible pneumatic housing units, to provide pressure fans not only at the lower part of the structure for blowing the cold night air through the heat exchanger layer and the adsorbent layer, but also at the upper part of the structure in order to supply the warm daytime air for desorption of the adsorbent layer and for causing the water saturated air to pass through the lower heat exchanger layer for cooling and condensing the water. Thus both fans are preferably pressure fans or blowers in order to inflate the unit. Of course, it is also possible to provide a light supporting framework for the collapsible pneumatic housing unit. In this instance it is not necessary to provide lower and upper pressure fans. If a framework is provided, it is sufficient to arrange only reversible fans since the framework will support the pneumatic housing unit. Such an arrangement is of advantage, for instance, to render the unit more resistant to heavy winds as they occur in desert areas. Of course, suitable devices for filtering the air and removing therefrom the fine dust particles must also be provided.

Construction of the water recovery plant by combining the permanent and rigid construction manner with the method of constructing collapsible pneumatic housing units is also possible. For this purpose not only the bottom part and the carrying grates for the heat exchange layer and the adsorbent but also the side walls up to the height of the heat exchange layer are constructed, for instance, in prefabricated reinforced concrete walls. The collapsible pneumatic housing unit is provided only at a height of the entire structure of between 6 m. and 8 m. It can be constructed with or without supporting framework. The advantage of this combination of permanent and collapsible structures is that no dead angle of about 4 m. to 6 m. is formed at the sides, that the heat exchange layer is vertically supported and propped, and that no dead space is created. As a result thereof, such a construction is more stable against the action of wind and storms. Blowing the air into the upper part of the structure also does not pose any problem.

Another embodiment of enclosing the water recovery plant in a collapsible pneumatic housing unit comprises the use of very light-weight, completely transparent foils, for instance, of a plastic material which may be reinforced by synthetic fiber material, for instance, of the polyester type. Such plastic foils are rather inexpensive and, therefore, can be replaced every few years, should they have become scratched by the desert sand and dust. A cover for the collapsible pneumatic housing may also consist of a two-layer plastic skin with variable air conduits for insulation and heating. Such two-layer foils are already known, for instance, for constructing collapsible pneumatic housing units for bathing halls and the like.

In such two-layer plastic foils or sheets, the outer layer can be black, dark, or orange colored in order to achieve optimum adsorption effects by continuously conducting off the air between said two layers. Dangerous overheating and thus softening of the plastic foil or sheet material which may be coated with polyvinyl chloride or the like plastic material which softens when heated can be avoided in this manner.

A water recovering system according to the present invention can readily be established by transporting by cross-country trucks the foundation parts, the grates for the adsorbent and the heat exchange agent, any lateral walls, the collapsible pneumatic housing units, the fans and filters, and the diesel engine for blowing the air into the system, to the site of operation. In this manner it is possible to start within a few weeks operation of water recovery plants which produce 1000 l. of water on an adsorbent area of 20 sq.m. Plants up to 1000 sq.m. of surface area producing up to 50,000 l. of water can be readily installed at any desired location. The trucks may be equipped with crane and grab buckets for collecting the stones in the desert, and with means to treat them with silicone, to classify them for size, and to place the classified stones upon the respective grate. Of course, any steel parts may be standardized, subjected to an anticorrosive treatment, and provided with gaskets or packing material and means for screwing together or otherwise joining the parts.

Figure 4:
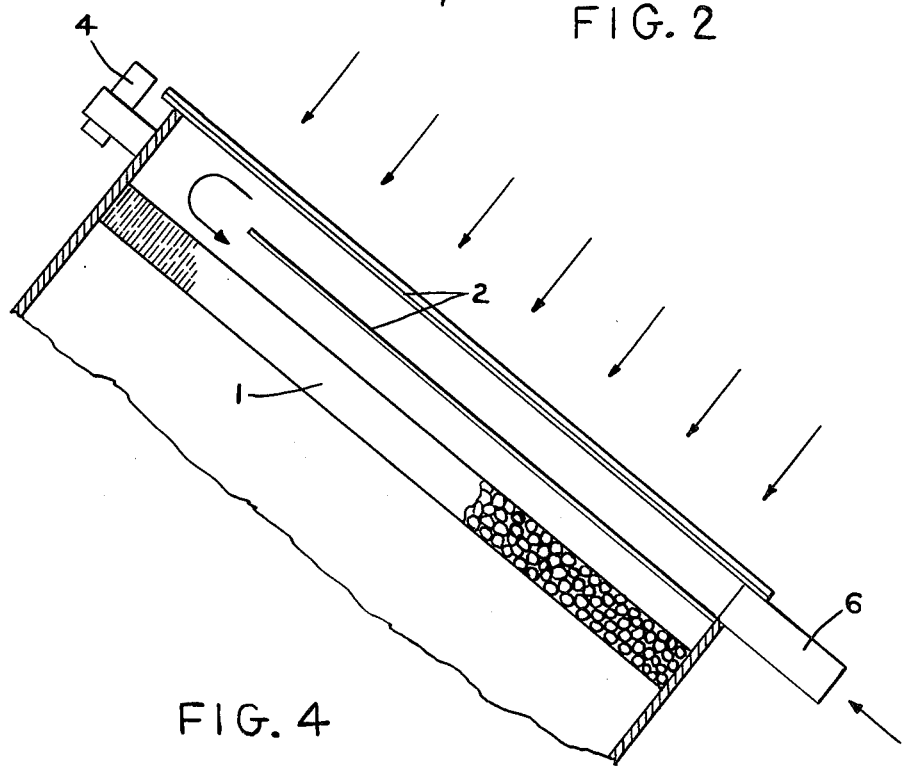
FIG. 4 illustrates, also in cross-sectional view, a system for collecting the sunrays, i.e. the energy of the sun.

Although, as stated above, the preferred mode of utilizing the energy of the sun comprises allowing the sun rays to directly irradiate the adsorbent layer, for instance, through glass panes or foils or sheets of transparent plastic, it can be of advantage under certain conditions to use special collectors as they are illustrated, for instance, in FIG. 4. Such sun ray collectors serve to increase the temperature of the air used for regeneration and desorption. They are provided before the air enters the adsorbent layer. The energy of the sun which is transferred to the daytime air amounts of about 15% to 25% of the desorption heat. The increase in temperature by about 10° C. to 13° C. results in an accelerated desorption.

The collector surface 1 consists of a dense layer of metal turnings or chips which possess a high spectral selectivity and at the same time have a high heat exchange effect upon the air passed therethrough. The air is conducted through conduits covered by one or two glass plates or transparent plastic sheets 2 which serve as roof cover of the water recovery plant. The air is introduced into the collector at 6 and enters the adsorbent layer at 7.

Of course, many changes and variations in the construction of the water recovery plant, in the adsorbent and the regenerative heat exchange agent, and the like may be made by those skilled in this are and in accordance with the principles set forth herein and in the claims attached hereto.

We claim:

1. A process for recovering water from air, comprising the steps of passing night air at a relatively low first temperature of up to about 20° C. first through a layer of a substantially non-adsorbing heat sink material of relatively high heat capacity so as to cool said non-adsorbing material to substantially said first temperature; thereafter passing the night air through a layer of coarsely granulated, shaped, moisture adsorbent material so as to adsorb the moisture content of the night air; passing ambient day-time air at a second temperature of from about 25° C. to about 70° C., which is sufficiently high to displace moisture from the adsorbing material, and at ambient pressure in reverse direction through the layer of adsorbent material having adsorbed thereon the moisture content of the night air, whereby the water adsorbed in the adsorbent layer is at least substantially removed therefrom by said ambient day-time air at ambient pressure; thereafter passing the moisture-containing day-time air through the layer of cooled, non-adsorbing material and condensing the water removed from the adsorbent layer on the cooled, non-adsorbent material; and recovering the condensed water from the non-adsorbent material.

2. The process according to claim 1, in which the adsorbent material is a coarsely grained, shaped silica gel particles.

3. The process of claim 2, in which the nonadsorbent materials are stones.

4. The process according to claim 2, in which the silica gel particles are spherically shaped and have a diameter of between about 8 mm and 12 mm.

5. The process according to claim 2, in which the substantially non-adsorbing material comprises substantially non-porous stone material of a high specific weight, the particles of said stone material having a diameter between 100 mm. and 200 mm.

6. The process according to claim 2, wherein said steps of passing air comprise supplying a plurality of individual air streams, by means of a plurality of air supplying means arranged side by side, at a low air velocity.

7. The process according to claim 6, further comprising the step of producing energy by transporting water recovered in said recovery step to a lower elevation.

8. The process according to claim 7, further comprising the step of using said energy for operating said air supplying means.

9. The process according to claim 8, wherein said first temperature is from about 5° C. to 15° C. and said second temperature is from about 30° C. to 60° C.

10. The process according to claim 2, in which the steps of passing night air are conducted for about 10 hours, followed each time by a rest period of about 2 hours, and said steps of passing day-time air in the opposite direction are conducted for about 10 hours, followed each time by a rest period of about 2 hours.

11. The process according to claim 2, in which the substantially non-adsorbing material comprises natural stone material of a diameter of 100 mm. to 200 mm., said natural stone material being covered by a thin silicone coating.

12. The process according to claim 2, further comprising the step of applying solar radiation to said silica gel during said step of passing ambient daytime air through said layer of silica, whereby the temperature of said ambient air can be raised from about 10° to 13° C. to accelerate removal of the adsorbed moisture.

13. The process according to claim 2, in which said moisture adsorbing material comprises a silica gel which permits water adsorption up to 20° C. and water desorption within the temperature range of about 25° C. to 70° C.

14. The process according to claim 2, wherein said silica gel comprises a silicon dioxide content between about 16% and about 24%, a pore diameter of between about 40 and about 50 Angstroem, a wetting heat of between about 15 and about 18 cal./g., a bulk weight between about 460 and about 520 g./cm.$^3$, an adsorption temperature of up to about 40° C. and a desorption temperature of between about 50° C. and about 70° C., and wherein said second temperature is between about 50° C. and about 70° C.

15. The process according to claim 2, wherein said silica gel comprises silicon dioxide content between about 16% and about 24%, a pore diameter of between about 50 and about 60 Angstroem, a wetting heat of between about 12 and about 15 cal./g., a bulk weight between about 300 and about 460 g./cm.$^3$, an adsorption temperature of up to about 30° C. and a desorption temperature of between about 40° C. and about 60° C., and wherein said second temperature is between about 40° C. and about 60° C.

16. The process according to claim 2, wherein said silica gel comprises silicon dioxide content between about 16% and about 24%, a pore diameter of between about 60 and about 70 Angstroem, a wetting heat of between about 10 and about 12 cal./g., a bulk weight between about 250 and about 350 g./cm.$^3$, an adsorption temperature of up to about 20° C. and a desorption temperature of between about 30° C. and about 50° C., and wherein said second temperature is between about 30° C. and about 50° C.

17. The process according to claim 16, wherein said silica gel is further characterized by the ability to adsorb up to 80% of its weight of water at a temperature between about 0° C. and about 20° C. and by a desorption effectiveness of from about 95% to about 98% at a temperature between about 50° C. and about 55° C.

18. The process according to claim 2, wherein said silica gel comprises a silicon dioxide content between about 16% and about 24%, a pore diameter between about 40 and 70 Angstroem, a wetting heat of between about 10 and 18 cal./g. a bulk weight between about 250 and 420 g./cm.$^3$, an adsorption temperature of up to about 40° C. and a desorption temperature between about 30° and 70° C., said silica gel having been produced by a process comprising the steps of precipitating a silicic acid-containing starting material and acid reactant to first form an unstable silicic acid containing sol as an intermediate product, subsequently gelling the sol, washing the gel to remove the salts, and drying the gel, wherein the improvements comprise carrying out the precipitation process in two steps, wherein in the first step a first silicic acid-containing starting material with a silicon dioxide content between about 20% and about 32% by weight is introduced in such a fine distribution and at such a high discharge velocity into the acid reactant, while being subjected to high speed agitation, until a pH-value of the acid reactant between about 1.5 and about 1.8 is attained, that instantaneous reaction between the acid and the silicic acid-containing starting material takes place without any precipitation of silicic acid, and wherein in the second precipitation step a second silicic acid-containing starting material having a silicon dioxide content between about 8% and about 14% by weight is introduced into the acid reactant until a pH-value of between about 2.6 and about 3.5 is attained, thereby producing a sol having a silicon dioxide content of about 14% to about 18% by weight, and carrying out the washing step by washing with a washing liquid of a pH between about 7 and about 12.

19. The process according to claim 2, wherein said night air is passed through a plurality of layers of silica gel particles, the particles in each layer having a pore size different from the particles in the other layers, and wherein said day-time air is passed through the same plurality of layers in the direction opposite to the direction in which the night air is passed through said layers.

20. The process according to claim 19, wherein said plurality of layers are arranged in order to increasing values of adsorption temperature in the direction of night air flow.

21. The process according to claim 2, further comprising the step of passing said day-time air through a solar-powered heating device prior to passing the day-time air through the layer of silica gel.

22. The process according to claim 2, wherein the step of displacing moisture from said silica gel consists essentially of passing said ambient day-time air through the layer of the silica gel particles.

23. A system for recovering water from air by adsorption during the night and desorption during the day-time, said system comprising a structural unit having an air penetrable intermediate bottom, at least one layer of a substantially non-adsorbing heat sink material having a high heat capacity placed on said bottom, a layer of an adsorbent material being provided on top of said non-adsorbing layer said adsorbent material being capable of adsorbing moisture at a temperature up to about 20° C. at ambient pressure and being capable of desorbing moisture at a temperature between about 25° C. and about 70° C., first means for passing night air at a relatively low first temperature into said structural unit and through said layer of heat sink material and through said layer of absorbent material, respectively, second means for passing ambient daytime air at a second temperature higher than said first temperature and sufficient to cause desorption of water from said adsorbent material into said structural unit and through said layer of adsorbent material and through said layer of heat sink material, respectively, and means associated with said layer of heat sink material for recovery therefrom water which has condensed out of said day-time air.

24. The system according to claim 23, in which the construction unit has a width between 100 m. and 200 m. and a length up to 15 km.

25. The system according to claim 23, in which the non-adsorbing material is in the form of shaped concrete spheres or natural stones of a high specific density and a low porosity, the particles of said non-adsorbing material having a diameter between 100 mm. and 200 mm.

26. The system according to claim 23, in which the non-adsorbing material is substantially non-porous and consists of natural stones selected from the group consisting of basalt and silicate stones, said stones being provided with a thin silicone coating to close any pores therein.

27. The system according to claim 23, further comprising an upper roofing on said structural unit comprising a roof permeable to the rays of the sun, whereby the temperature of the day-time air passing through the adsorbent material layer is increased by solar radiation.

28. The system according to claim 27, in which the roof permeable to the rays of the sun comprises a material selected from the group consisting of glass, polyacrylic plastic, and polyester.

29. The system according to claim 23, in which the structural unit consists of a plurality of separate building elements of like construction being arranged so as to provide passages between said building elements.

30. The system according to claim 23, further comprising a web of a filter fabric pivotally provided underneath the intermediate bottom carrying the non-adsorbing material layer, and a plurality of brushing devices with rotating brushes capable of being raised or lowered and travelling along said web of filter fabric provided in operative relationship underneath said web.

31. The system according to claim 23, wherein said second air passing means comprises openings for admitting air into the space above the adsorbent material layer, filters pivotably connected over said openings and air supplying means arranged behind said filters.

32. The system according to claim 31, wherein said first air passing means comprises a plurality of low-speed blowers located below said heat sink layer and said second air passing means comprises a plurality of low-speed blowers located above said layer of adsorbent.

33. The system according to claim 31, further comprising means for transporting water from said heat sink layer to a position at least 200 m. lower in altitude and means located at said lower position for converting the water pressure head into energy.

34. The system according to claim 33, further comprising means for supplying said blowers with energy produced by said conversion means.

35. The system according to claim 34, wherein said conversion means is the sole source of mechanically-produced energy in said system.

36. The system according to claim 23, wherein the absorbent is a coarsely grained, shaped silca gel.

37. The system according to claim 36, wherein said silica gel comprises generally spherically shaped particles having a diameter between about 8 mm and 12 mm.

38. The system according to claim 37, wherein said silica gel comprises silicon dioxide content between about 16% and about 24%, a pore diameter of between about 40 and about 50 Angstroem, a wetting heat of between about 15 and about 18 cal./g., a bulk weight between about 460 and about 520 g./cm.$^3$, an adsorption temperature of up to about 40° and a desorption temperature of between about 50° C. and about 70° C.

39. The system according to claim 37, wherein said silica gel comprises silicon dioxide content between about 16% and about 24%, a pore diameter of between about 50 and about 60 Angstroem, a wetting heat of between about 12 and about 15 cal./g., a bulk weight between about 300 and about 460 g./cm.$^3$, an adsorption temperature of up to about 30° and a desorption temperature of between about 40° C. and about 60° C.

40. The system according to claim 37, wherein said silica gel comprises a silicon dioxide content between about 16% and about 24%, a pore diameter of between about 60 and about 70 Angstroem, a wetting heat of between about 10 and about 12 cal./g., a bulk weight between about 250 and about 350 g./cm.$^3$, an adsorption temperature of up to about 20° and a desorption temperature of between about 30° C. and about 50° C.

41. The system according to claim 40, wherein said silica gel is further characterized by the ability to adsorb up to 80% of its weight of water at a temperature between about 0° C. and about 20° C. and by a desorption effectiveness of from about 95% to about 98% at a temperature between about 50° C. and about 55° C.

42. The system according to claim 37, wherein said silica gel comprises a silicon dioxide content between about 16% and about 24%, a pore diameter between about 40 and 70 Angstroem, a wetting heat of between about 10 and 18 cal./g. a bulk weight between about 250 and 420 g./cm.$^3$, an adsorption temperature of up to about 40° C. and a desorption temperature between about 30° and 70° C., said silica gel having been produced by a process comprising the steps of precipitating a silicic acid containing starting material and acid reactant to first form an unstable silicic acid containing sol as an intermediate product, subsequently gelling the sol, washing the gel to remove the salts, and drying the gel, wherein the improvements comprise carrying out the precipitation process in two steps, wherein in the first step a first silicic acid-containing starting material with a silicon dioxide content between about 20% and about 32% by weight is introduced in such a fine distribution and at such a high discharge velocity into the acid reactant, while being subjected to high speed agitation, until a pH-value of the acid reactant between about 1.5 and about 1.8 is attained, that instantaneous reaction between the acid and the silicic acid-containing starting material takes place without any precipitation of silicic acid, and wherein in the second precipitation step a second silicic acid-containing starting material having a silicon dioxide content between about 8% and about 14% by weight is introduced into the acid reactant until a pH-value of between about 2.6 and about 3.5 is attained, thereby producing a sol having a silicon dioxide content of about 14% to about 18% by weight, and carrying out the washing step by washing with a washing liquid of a pH between about 7 and about 12.

43. The system according to claim 36, comprising a plurality of layers of silica gel particles, the particles in each layer having a pore size different from the particles in the other layers.

44. The system according to claim 43, wherein said layers of silica gel are arranged in order of increasing values of adsorption temperature from the lowermost layer to the uppermost layer.

* * * * *